(12) United States Patent
Metzger

(10) Patent No.: US 12,536,353 B2
(45) Date of Patent: Jan. 27, 2026

(54) SYSTEM MODELLING USING FLUID TRANSFER AND STORAGE

(71) Applicant: Jan Metzger, Kowloon (HK)

(72) Inventor: Jan Metzger, Kowloon (HK)

(*) Notice: Subject to any disclaimer, the term of this patent is extended or adjusted under 35 U.S.C. 154(b) by 0 days.

(21) Appl. No.: 18/371,702

(22) Filed: Sep. 22, 2023

(65) Prior Publication Data

US 2025/0103781 A1  Mar. 27, 2025

(51) Int. Cl.
*G06F 30/28* (2020.01)

(52) U.S. Cl.
CPC .................................. *G06F 30/28* (2020.01)

(58) Field of Classification Search
CPC ................................. G06F 30/28; G06F 30/00
USPC ........................................................ 703/9, 6
See application file for complete search history.

(56) References Cited

U.S. PATENT DOCUMENTS

| 2014/0303949 | A1* | 10/2014 | Boneti | G06Q 10/06 |
| | | | | 715/771 |
| 2016/0098502 | A1* | 4/2016 | Havre | G06F 30/20 |
| | | | | 703/9 |
| 2016/0298883 | A1* | 10/2016 | Louvar | H05K 7/20827 |

FOREIGN PATENT DOCUMENTS

| CN | 103365308 A | 10/2013 |
| CN | 108415356 A | 8/2018 |
| CN | 209447413 U | 9/2019 |
| CN | 111426353 A | 7/2020 |
| CN | 214152085 U | 9/2021 |
| CN | 114152555 A | 3/2022 |
| CN | 216559253 U | 5/2022 |
| KR | 101278033 B1 | 6/2013 |

OTHER PUBLICATIONS

Pumpsim 3D Pumping Simulation Software, Version 2.2 User Manual, pp. 1-169 (Year: 2016).*
Zhang, Xue et al., "An Optimal Regulation Method for Parallel Water-Intake Pump Group of Drinking Water Treatment Process", May 15, 2020, Major Science and Technology Program for Water Pollution Control and Treatment, IEEE Access. (Year: 2020).*

* cited by examiner

*Primary Examiner* — Cedric Johnson
(74) *Attorney, Agent, or Firm* — Genius Patent APC; Bruce Angus Hare

(57) ABSTRACT

A fluid-based system model is described. The fluid model may include multiple vessels that each store an amount of fluid. The vessels may be coupled to each other via pumps and conduit. Volumes of the fluid in each vessel may be determined and used to control the operations of the pumps such that fluid is transferred among vessels based on the associated volume(s). The fluid model may provide a visual and/or physical representation of various systems or system components.

17 Claims, 13 Drawing Sheets

SYSTEM MODELLING USING FLUID TRANSFER AND STORAGE

BACKGROUND

Existing modelling solutions may generate arcane results that are data-intensive and hard to share or evaluate.

Therefore, there exists a need for ways to provide intuitive visual and/or physical modelling of systems.

BRIEF DESCRIPTION OF THE SEVERAL VIEWS OF THE DRAWING

The novel features of the disclosure are set forth in the appended claims. However, for purpose of explanation, several embodiments are illustrated in the following drawings.

DETAILED DESCRIPTION

The following detailed description describes currently contemplated modes of carrying out exemplary embodiments. The description is not to be taken in a limiting sense, but is made merely for the purpose of illustrating the general principles of some embodiments, as the scope of the disclosure is best defined by the appended claims.

Various features are described below that can each be used independently of one another or in combination with other features. Broadly, some embodiments generally provide ways to model systems using fluid. Vessels (e.g., beakers) may be used to indicate quantities or levels of various system attributes. Pumps may transfer fluid among the vessels based on various appropriate algorithms. Fluid levels may indicate various results or attributes over time.

Figure 1:
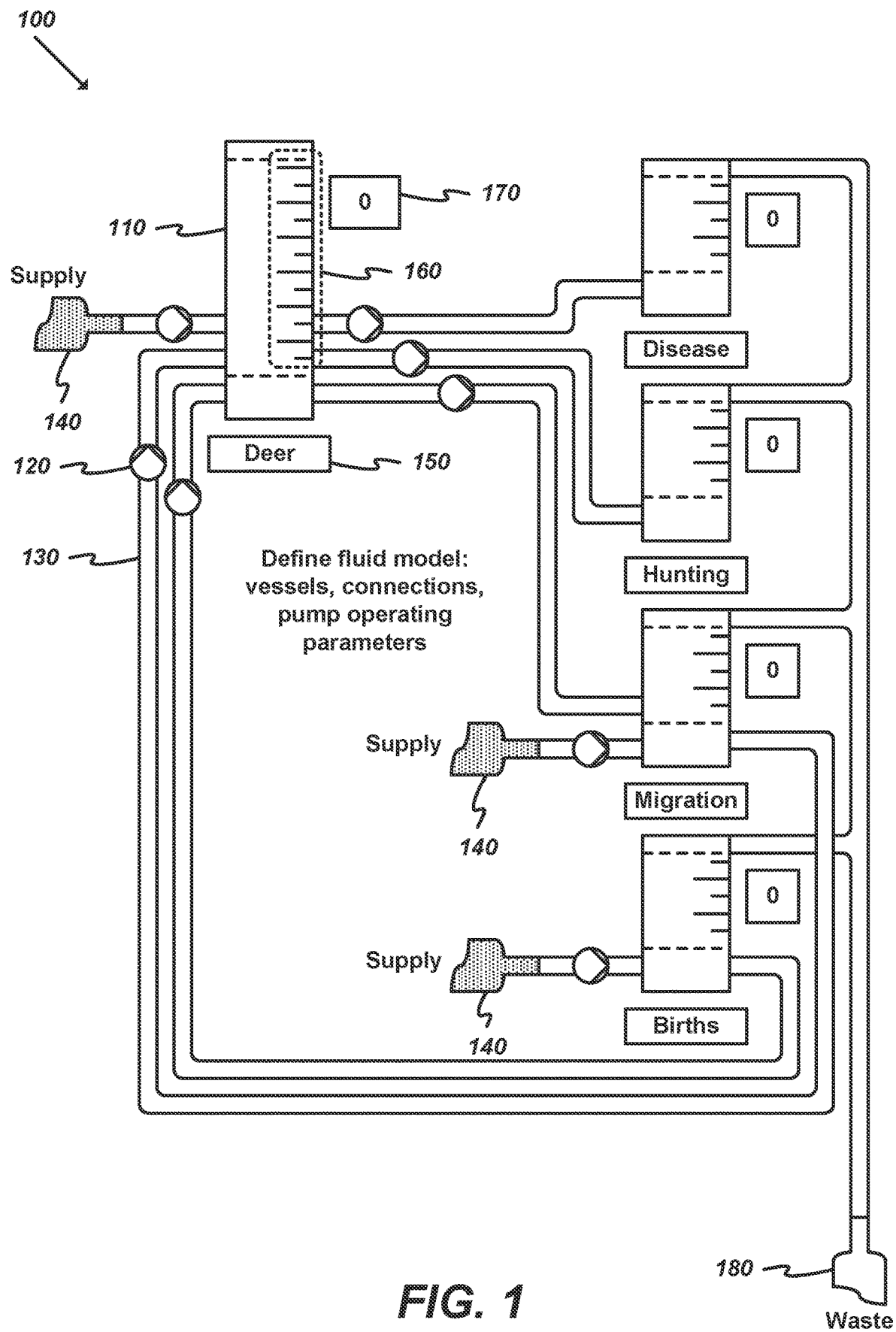
FIG. 1 illustrates an example overview of one or more embodiments described herein, in which a fluid model is defined.

FIG. 1 illustrates an example overview of one or more embodiments described herein, in which a fluid model 100 is defined. The fluid model 100 in this example is associated with modelling of deer population for a region. A fluid model definition associated with the fluid model 100 may include, for instance, a listing of elements, a set of connections for each element, operating parameters for each element, and/or other relevant information that may be used to implement the fluid model 100.

In this example, fluid model 100 includes a set of vessels 110, a set of pumps 120, conduit 130, a fluid supply 140, labels 150, vessel markings 160, volume indicators 170, and a connection for collecting waste 180. Fluid model 100 may be a physical structure (e.g., using beakers, tubing, etc.) and/or may be implemented as a virtual structure or graphical user interface (GUI). Throughout this disclosure, the term "fluid model" may refer to physical structures, GUIs or virtual elements, and/or combinations of such elements (e.g., an augmented reality system).

Each vessel 110 may be able to receive and retain fluid (e.g., water). Each vessel 110 may have multiple inputs and multiple outputs. Vessels 110 may be made from transparent materials (e.g., glass, plastic, etc.) such that fluid levels are visible. Vessels 110 may be of varying size, shape, and/or have other varying attributes, as appropriate. For simplicity, the number of different vessels 110 may be limited in some cases (e.g., three sizes of beaker may be available for use as vessels 110). In this example, each vessel 110 may be a cylindrical beaker. Each vessel 110 may be associated with various sensors (e.g., volume sensor, flow sensor, etc.).

Each pump 120 may be able to move fluid from one vessel 110 to another vessel 110. Pump 120 may also be able to draw fluid from a supply 140 and/or provide fluid to a connection for collecting waste 180. Pump 120 may be able to act as a valve, whereby fluid may be prevented from moving through or via the pump 120 if the pump 120 is not active. Pump 120 may operate based on various algorithms and/or equations that may utilize data associated with vessels 110 and/or other components of fluid model 100. For instance, an amount of fluid to transfer between a first vessel 110 and a second vessel 110 may be determined based on volume of fluid in the first vessel 110 and/or volume of fluid in the second vessel 110. Each pump may be associated with various sensors (e.g., a flow sensor).

Conduit 130 may include various connectors, couplings, piping, tubing, and/or other appropriate elements that may allow fluid to be moved among components of the fluid model 100. In some embodiments, conduit 130 may include flexible tubing that may allow a variety of connections among elements of the fluid model 100.

Fluid supply 140 may be a supply such as a tap or other connection to running water. In some cases, fluid supply 140 may be a large vessel 110 that may store an amount of fluid that is sufficient to operate the fluid model 100. Fluid supply 140 is associated with a fill pattern that indicates fluid is present.

Label 150 may include various descriptive elements that may be visible to users. In some cases, label 150 may be, or utilize, a resource such as an electronic display screen. Label 150 may indicate information such as a title, attribute(s) associated with a vessel 110, a listing of inputs and/or outputs, and/or other relevant information (e.g., listing an algorithm or equation used by a pump 120).

Vessel markings 160 may provide a visual reference as to the amount of fluid in a vessel 110. In this example, the vessels 110 are empty. The vessel markings 160 may be spaced at regular intervals and/or utilize other appropriate scales (e.g., a logarithmic scale).

Volume indicator 170 may be an electronic display or similar element that is able to display a sensed or calculated volume of a vessel 110. The volume indicator may be normalized to a particular attribute. For instance, in this example, where a deer population is modeled, the volume indicator may display only integer values. In this state, each volume indicator 170 shows a zero value, indicating that the associated vessel 110 is empty. Some embodiments of the fluid model 100 may include various other types of indicators, such as volume of fluid received from supply 140, volume of fluid delivered to waste 180, time elapsed, update frequency, etc.

Waste 180 may be a resource such as a large vessel 110, drainpipe, etc. Waste 180 may be able to collect any overflow or unneeded fluid from the fluid model 100. In this example, several vessels 110 include overflow connections to waste 180, as shown.

In some embodiments, any overflow may be measured (or calculated) and the amount may be stored or combined with an existing total. Thus, although each vessel 110 may have a maximum volume associated with the maximum fill line 220, and any additional volume may be measured and indicated by a resource such as volume indicator 170 (even though the volume indicated by the vessel 110 itself may not be accurate). Likewise, any additional fluid received from supply 140 may be measured (or calculated) and the amount may be stored or combined with an existing total. Thus, although each vessel 110 may have a minimum volume associated with the minimum fill line 210, and any negative values caused by fluid extraction may be mitigated via supply 140, and measured and indicated by a resource such as volume indicator 170 (even though the volume indicated by the vessel 110 itself may not be accurate).

Figure 2:
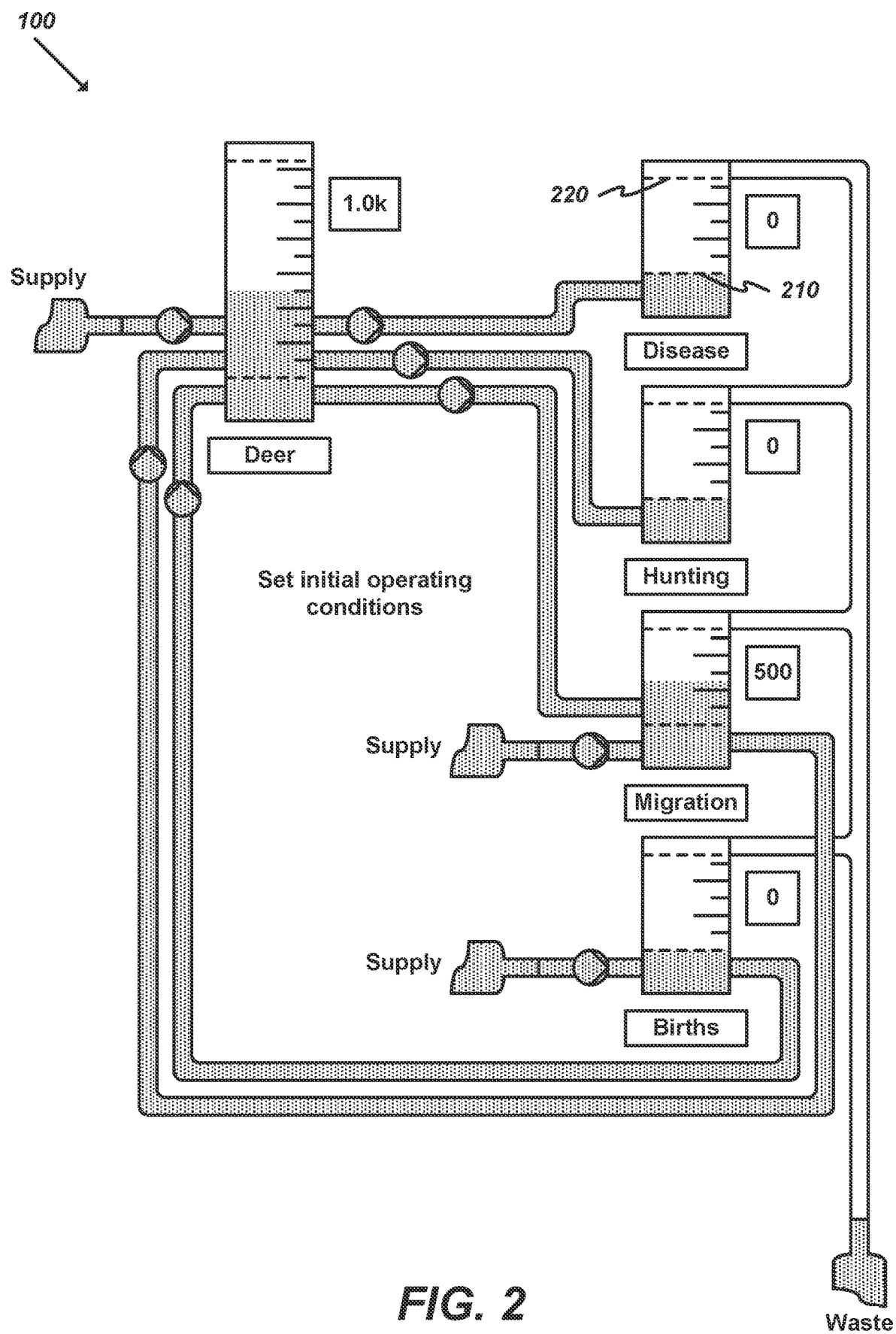
FIG. 2 illustrates an example overview of one or more embodiments described herein, in which initial operating conditions of the fluid model are set.

FIG. 2 illustrates an example overview of one or more embodiments described herein, in which initial operating conditions of the fluid model 100 are set. As shown, each vessel 110 may include a minimum fill line 210 and a maximum fill line 220. The minimum fill line 210 may ensure that fluid is available to each pump 120 and that any fluid movement (e.g., through a pump 120) is fluid coupled to connected elements. The maximum fill line 220 may ensure that any fluid received at a vessel input is able to be collected at the vessel 110 (and/or directed to another component).

As shown, supply 140 may be used to fill the "deer" vessel 110 to a nominal level about which fluid may be added and removed (indicating an initial population of deer in this example). The "migration" vessel 110 is similarly filled to a nominal level (indicating an initial population of nearby deer available for migration). The "disease", "hunting", and "births" vessels are filled to the minimum fill line 210.

In this example, the "births" vessel 110 and "migration" vessel 110 are coupled to supplies 140 such that additional fluid may be added without removing the fluid from other vessels 110. In some embodiments, each vessel 110 may include such a supply 140 connection, whether direct or indirect (e.g., via one or more other elements). In the case of the "births" vessel, the amount of fluid received from supply 140 may be at least partly based on the volume of fluid in the "deer" vessel 110, even though no fluid connection is shown.

Each volume indicator 170 shows an amount of deer associated with each volume of fluid in each vessel 110.

Figure 3:
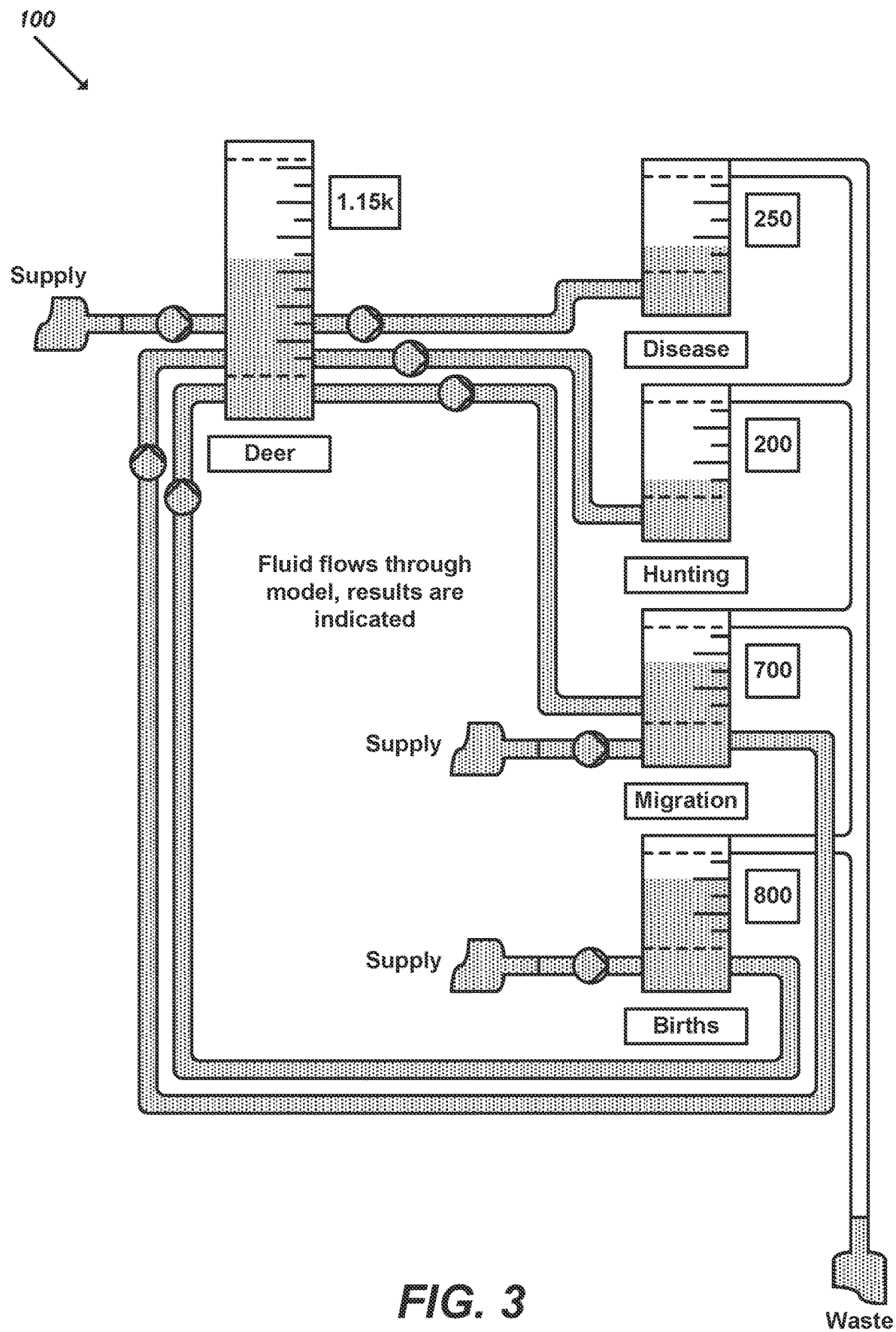
FIG. 3 illustrates an example overview of one or more embodiments described herein, in which results of the fluid model are indicated.

FIG. 3 illustrates an example overview of one or more embodiments described herein, in which results of the fluid model 100 are indicated. In this simplified example, various amounts of deer have been lost due to disease, hunting, and migration. In addition, a number of new births have been added to the deer population. The fluid model 100 may continue to progress in a similar manner over time. Users may be able to update various parameters as the fluid model 100 progresses. For instance, rates of disease or migration may be updated based on new data or to evaluate alternative plans.

In this example, the amount of fluid pumped to the "disease", "hunting", and "migration" vessels 110 may be based at least partly on the volume of fluid in the "deer" vessel 110. For instance, the amount of deer lost to disease may be modeled as a percentage of the total population. Similarly, the amount of migration into the deer population may be based at least partly on the volume of fluid in the "migration" vessel 110. Thus, the various pumps 120 may be used to implement the fluid model 100 based on data stored by, and/or measured by, the fluid model 100.

This example was simplified for clarity, and different embodiments may include further detail among various elements. For instance, the "disease" vessel 110 may be divided into different vessels 110 representing various diseases. As another example, the "hunting" vessel 110 may be divided into different vessels 110 representing licensed hunting and poaching. As another example, the "deer" vessel 110 may be divided into "male" and "female" vessels 110, where new births are based on the number of female deer (as represented by the volume of fluid in a "female deer" vessel 110). Continuing the example, female deer may be further delineated by age and/or other factors.

In some cases, additional variables or inputs may be included in the fluid model 100. For instance, available food supply may supply an input to the "births" vessel 110, where the volume of fluid in the "food supply" vessel 110 may be based on information and/or fluid received from another fluid model 110 (e.g., a "food supply" fluid model 100), an initial value based on measured or assumed supply levels, and/or other relevant information.

The fluid model 100 may continue to progress in a similar manner over time. Users may be able to update various parameters as the fluid model 100 progresses, if desired. For instance, rates of disease or migration may be updated based on new data or to evaluate alternative plans. Similarly, the fluid model 100 may be returned to the same initial operating conditions as various parameters, algorithms, equations, etc. are adjusted and/or updated.

In some embodiments, attributes of the fluid model 100 may be adjusted and/or modified based on environmental factors. For instance, any water that evaporates may be replaced via supply 140. As another example, a broken vessel 110 may be replaced by stopping fluid flow of the fluid model 100, disconnecting the broken vessel 110, connecting a replacement vessel 100, and restarting fluid flow.

Fluid models 100 may be based on various use cases or fields. For example, a "business" fluid model 100 may include vessels 110 such as "revenue", "expenses", "advertising", "taxes", "profit/loss", etc. As another example, a "manufacturing" fluid model 100 may include vessels 110 such as "raw materials", "work-in-progress", "inventory", etc. Fluid models 100 may be combined and/or associated in various ways. For instance, a "manufacturing" fluid model 100 may be a sub-model of a "business" fluid model 100. As another example, a "government" fluid model 100 may include a number of "business" fluid models 100 (among various other types of models). As another example, a fluid model 100 associated with a retail business may receive information and/or fluid from a fluid model 100 associated with a supplier of the retail business such as a manufacturer.

Figure 4:
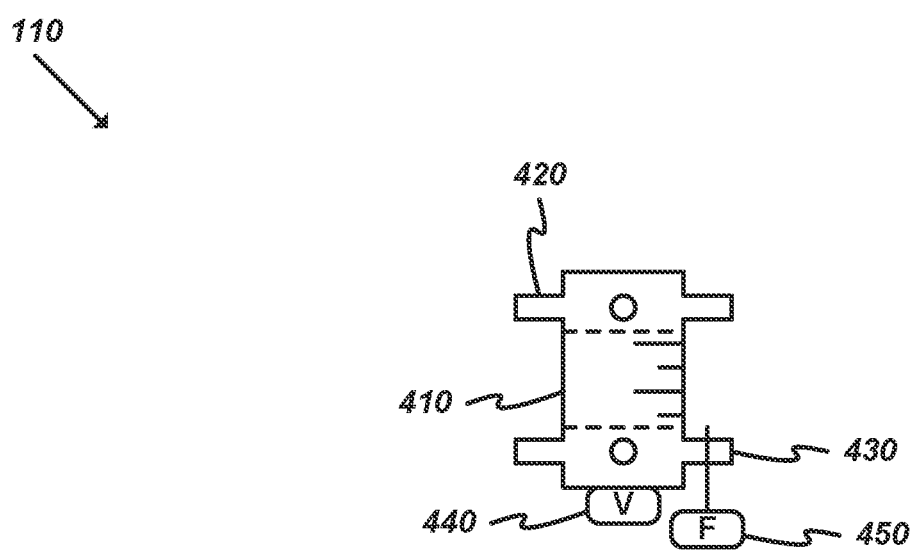
FIG. 4 illustrates a front elevation view of a vessel of one or more embodiments described herein.
Figure 5:
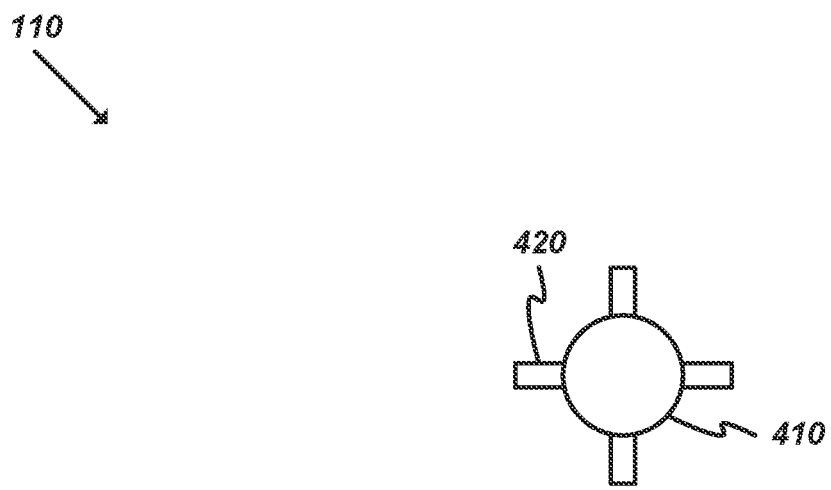
FIG. 5 illustrates a top plan view of a vessel of one or more embodiments described herein.

FIG. 4 illustrates a front elevation view of a vessel 110 of one or more embodiments described herein. FIG. 5 illustrates a top plan view of a vessel 110 of one or more embodiments described herein.

Vessel body 410 may be a cylindrical element that may include glass, plastic, and/or other transparent materials that may be able to retain fluid such as water. Vessel body 410 may include a set of inputs 420 and a set of outputs 430. Vessel body 410 may include various markings and/or indicators, such as vessel markings 160, minimum fill line 210, maximum fill line 220, etc. Vessel body 410 may have a bottom or base portion, a cylindrical portion, and a top or cap portion in some embodiments. In some embodiment, the vessel body 410 may have an open top.

Each input 420 may be a cylindrical member having two open ends, associated with a port in the vessel body 410. Each output 430 may be a cylindrical member having two open ends, associated with a port in the vessel body 410. The inputs 420 and outputs 430 may be integrated with the vessel body 410. For example, the components 410-430 may be formed from one piece of glass or plastic. This example includes four inputs 420 and four outputs 430 extending radially from the vessel body 410, but different embodiments may include different numbers of inputs 420 and/or outputs 430 (e.g., eight, sixteen, etc.). The number of inputs 420 and outputs 430 may be based on various relevant factors, such as size of the vessel body 410, requirements of the fluid model 100, size of conduit 130, etc.

In this example, each input 420 is below the minimum fill line 210 and each output 430 is above the maximum fill line 220 in order to ensure that fluid (or space) is available for fluid to flow into and/or out of the vessel 110.

In some embodiments, an input 420 may serve as an output or as a combined input/output. Likewise, an output 430 may serve as an input or as a combined input/output.

Volume sensor 440 may be any sensor that is able to measure a volume of fluid in the vessel 110. Such sensors may include, for example, weight sensors, float sensors, etc. Volume sensor 440 may be coupled to the vessel body 410 and/or otherwise associated with the vessel body 410 (e.g., a weight sensor may be included in a base on which the vessel 110 rests).

Each flow sensor 450 may be able to measure fluid that flows into or out of an input 420 or output 430, respectively. In some cases, each input 420 and each output 430 may be associated with a flow sensor 450. In some cases, overall flow may be calculated based on data received from a resource such as volume sensor 440.

Figure 6:
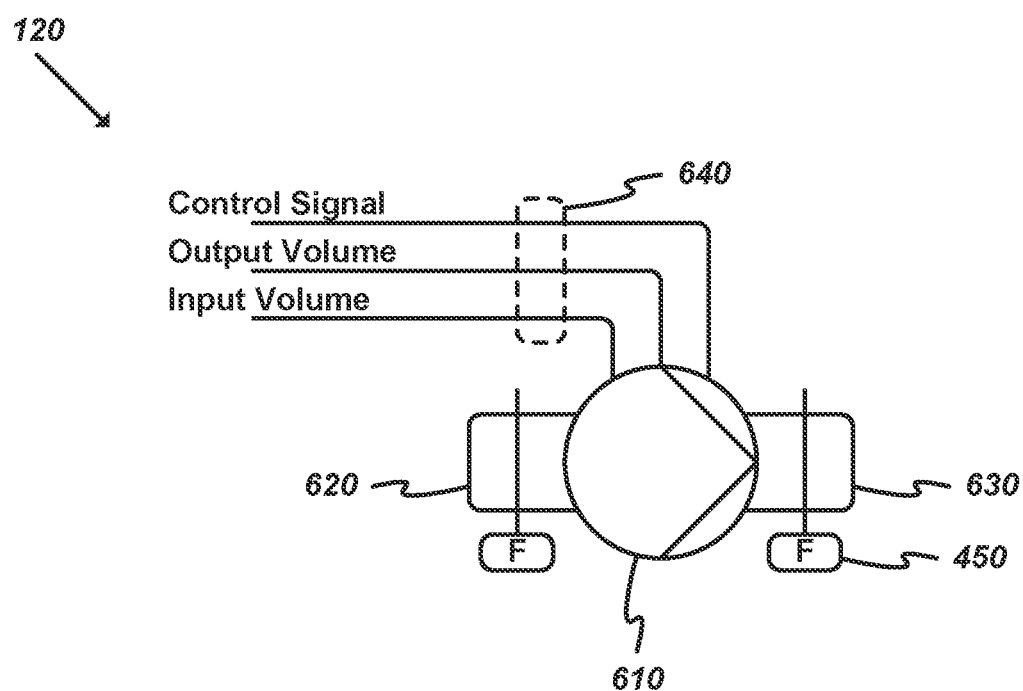
FIG. 6 illustrates a front elevation view of a pump of one or more embodiments described herein.

FIG. 6 illustrates a front elevation view of a pump 120 of one or more embodiments described herein. As shown, pump 120 may include a pump housing 610, a pump inlet 620, a pump outlet 630, and a set of pump control signals 640. Each pump 120 may receive power from an appropriate source (e.g., a power bus, battery, etc.). Each pump 120 may be controllable and/or may automatically implement various algorithms or equations. For instance, a pump 120 may move fluid based on the volume of fluid in one or more vessels 110.

Pump housing 610 may include various materials and/or features that may form a pump capable of moving fluid along conduit 130, into and/or out of vessels 110, etc. Pump 120 may include various components that are at least partly enclosed by pump housing 610, such as an impeller, motor, shaft, etc.

Pump inlet 620 may include a port (e.g., a circular hole or a cylindrical member) or similar element that may be coupled to conduit 130, vessel 110, and/or other appropriate elements. Pump inlet 620 may receive fluid and supply the received fluid to the pump housing 610.

Pump outlet 630 may include a port (e.g., a circular hole or a cylindrical member) or similar element that may be coupled to conduit 130, vessel 110, and/or other appropriate elements. Pump outlet 630 may receive fluid from the pump housing 610 and supply the received fluid to another component.

Pump control signals 640 may at least partly direct the operations of pump 120. In some cases, pump 120 may include a controller, processor, and/or similar components that are able to execute various algorithms, equations, etc. In some cases, pump 120 may receive instructions from a resource such as a controller, processor, another pump 120, etc. In this example, the pump 120 may implement algorithms or equations based on "input volume" (e.g., a volume of fluid in a vessel 110 associated with the pump inlet 620), "output volume" (e.g., a volume of fluid in a vessel 110 associated with the pump outlet 630), and/or a "control signal" that may be received from another element.

As shown, in some embodiments, the pump 640 may include flow sensors 450 at the pump inlet 620 and/or pump outlet 630.

Figure 7:
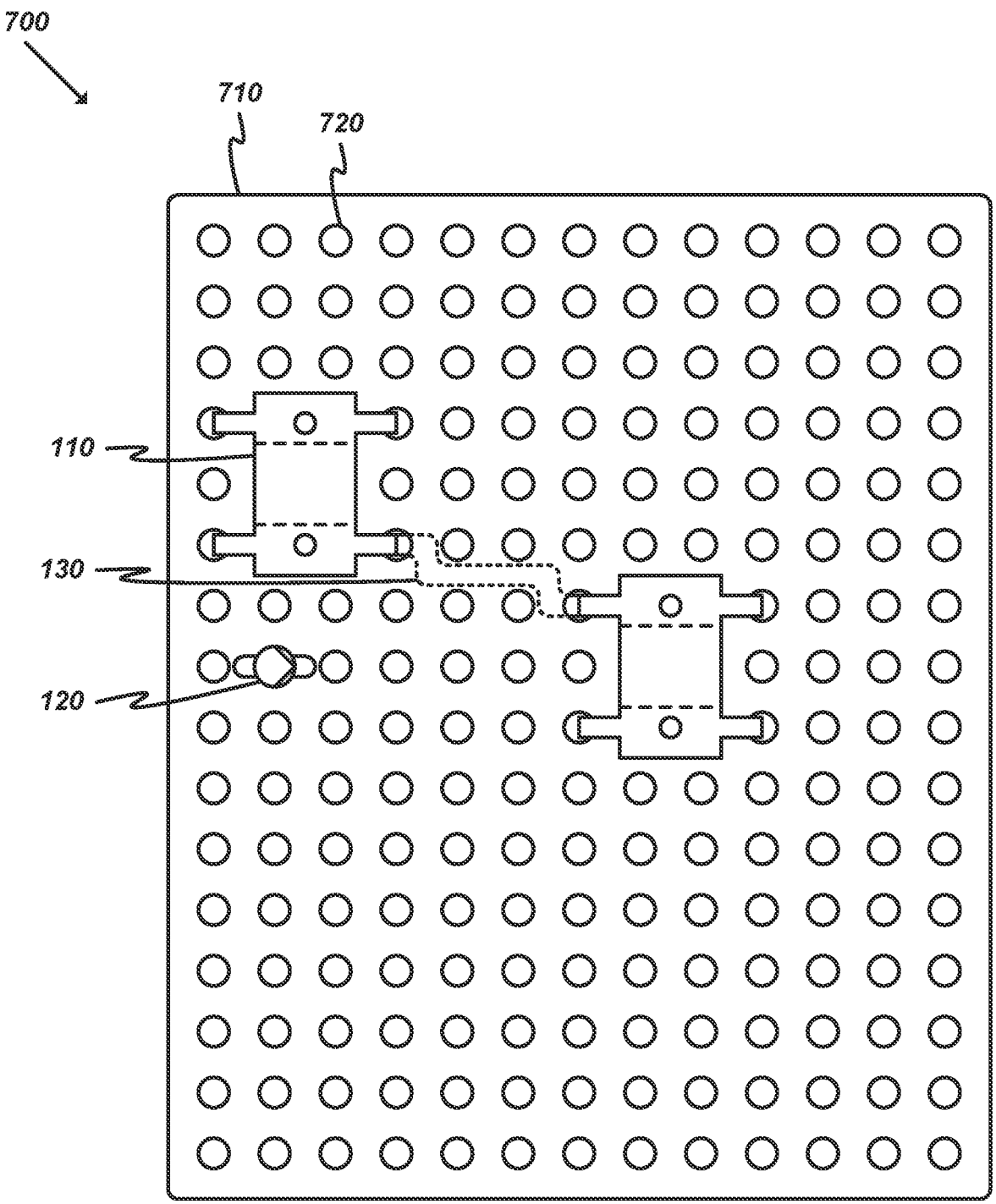
FIG. 7 illustrates a front elevation view of a fluid model fixture of one or more embodiments described herein.

FIG. 7 illustrates a front elevation view of a fluid model fixture 700 of one or more embodiments described herein. Different embodiments may include, utilize, and/or otherwise be associated with various fixtures, connections, mountings, and/or other appropriate components (e.g., shelves, bases, lighting, power, etc.).

Mounting board 710 may be a rigid board or panel that may include various mounting features such that, for instance, the board may be coupled to a vertical surface such as a wall. Mounting board 710 may include, utilize, and/or be associated with, various elements, such as power supplies or connectors, fluid supplies or connectors, electronics (e.g., a controller or processor), and/or other appropriate elements.

Mounting holes 720 may be evenly spaced along mounting board 710 as shown. Mounting holes 720 may be sized such that conduit 130 may pass through the mounting holes 720. Each vessel 110 may include, or be associated with, various mounting features (e.g., a base or shelf that couples to the mounting holes 720, one or more mounting posts that extend from the vessel body 410 and engage one or more mounting holes 720, a fastener such as a radial clamp or cable tie, etc.).

Other components, such as labels 150, volume indicators 170, and/or other such elements may be coupled to the mounting board 710 in various appropriate ways (e.g., adhesives, mounting posts, bases or shelves, fasteners, etc.).

Figure 8:
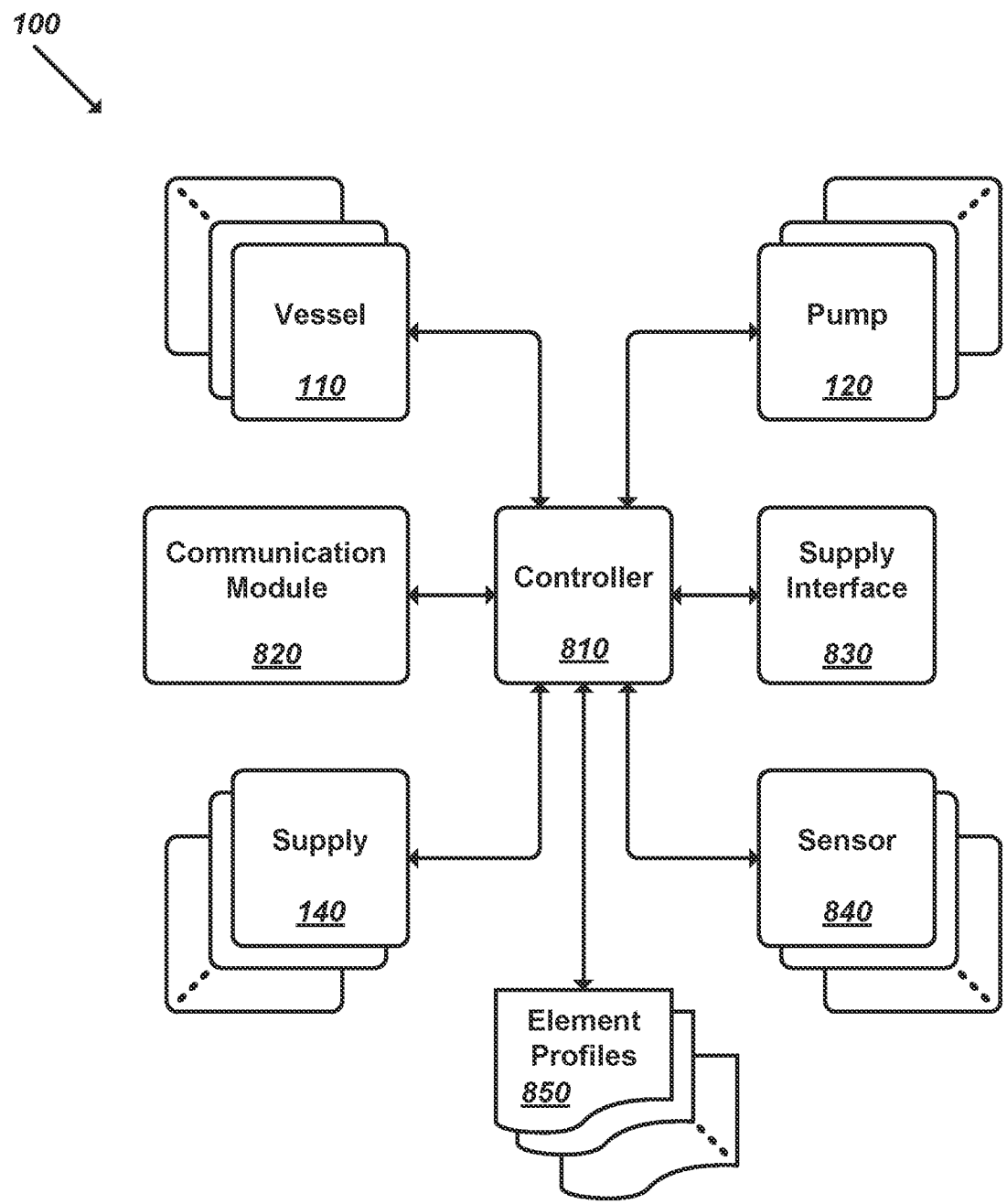
FIG. 8 illustrates a schematic block diagram of a fluid model of one or more embodiments described herein.

FIG. 8 illustrates a schematic block diagram of a fluid model 100 of one or more embodiments described herein. In this example, fluid model 100 includes a controller 810, a set of vessels 110, a set of pumps 120, a communication module 820, a supply interface 830, a set of supplies 140, and a set of sensors 840. The fluid model 100 may include or utilize a set of element profiles 850.

Controller 810 may be an electronic device that is able to execute instructions and/or otherwise process data. Controller 810 may at least partly direct the operations of other elements of the fluid model 100.

Each vessel 110 may include, utilize, and/or be associated with various sensors 840, such as sensors 440 and 450, volume indicator 170, labels 150, and/or other appropriate elements.

Each pump 120 may include, utilize, and/or be associated with various sensors 840, such as sensors 440 and 450.

Communication module 840 may be able to communicate across various wired and/or wireless channels to allow the fluid model 100 to interact with external components such as user devices (e.g., smartphones), servers, other fluid models 100, etc.

Supply interface 830 may include various actuators, relays, and/or other control elements that may be able to interact with a supply 140.

Each sensor 840 may be a volume sensor 440, a flow sensor 450, and/or other appropriate types of sensors (e.g., a temperature sensor and/or other environmental sensors may be used to estimate evaporation).

Each element profile 850 may include information related to an element such as vessel 110, pump 120, volume indicator 170, sensor 840, and/or other component of the fluid model 100.

Fluid model 100 may include resources such as storage or memory (not shown) that may be able to store data such as element profiles 850, fluid model definitions, etc.

Figure 9:
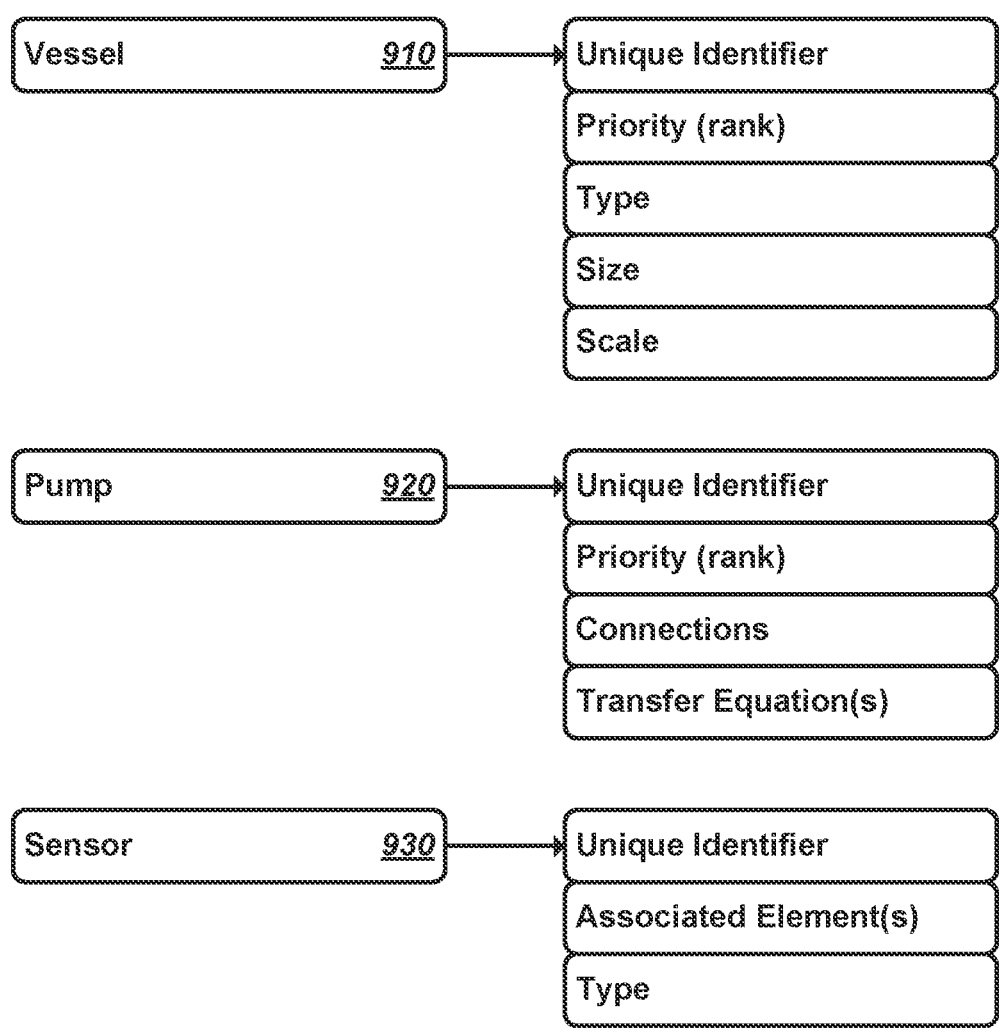
FIG. 9 illustrates a data structure diagram of a set of data elements of one or more embodiments described herein.

FIG. 9 illustrates a data structure diagram 900 of a set of data elements of one or more embodiments described herein. In this example, the set of data elements includes a vessel element 910, a pump element 920, and a sensor element 930. In some embodiments, sets of elements may be combined in a resource such as a database or lookup table (e.g., a lookup table may include a listing of vessel elements 910, with each sub-element included in a different column of the lookup table). Data elements 910-930 may be examples of element profiles 850.

Each vessel element 910 may be associated with a particular vessel 110 and may include, for example, a unique identifier (e.g., a serial number), a priority or rank of evaluation, a type (e.g., indicating shape, number of inputs/outputs, etc.), size, scale (e.g., indicating a number of elements associated with each vessel marking 160 or otherwise associating a volume with a value), and/or other relevant components.

Each pump element 920 may be associated with a particular pump 120 and may include, for instance, a unique identifier (e.g., a serial number), a priority or rank of evaluation, a listing of connected elements (e.g., conduit or vessels 910), transfer equations or algorithms, and/or other relevant components.

Each sensor element 930 may be associated with a particular sensor 840 and may include, for example, a unique identifier (e.g., a serial number), a listing of associated elements (e.g., vessels 910, pumps 920, etc.), a type (e.g., volume, flow, temperature, etc.), and/or other relevant components.

Other data elements may include, for instance, a conduit section element (not shown) that may include a unique identifier, type, size, connections, and/or other relevant components. As another example, data elements may include a volume indicator element associated with a particular volume indicator 170 that may include a unique identifier, scale, output type, and/or other relevant components.

Figure 10:
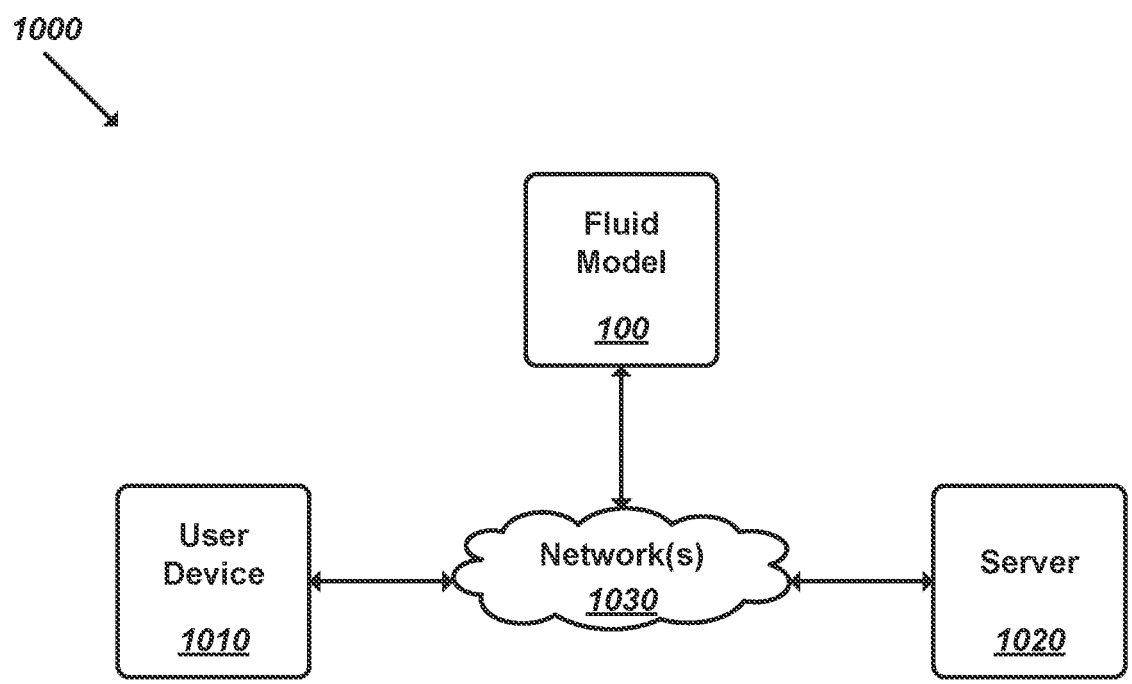
FIG. 10 illustrates a schematic block diagram of an environment of one or more embodiments described herein.

FIG. 10 illustrates a schematic block diagram of an environment 1000 of one or more embodiments described herein.

Fluid model 100 may be able to communicate across networks 100 and/or otherwise interact with user devices 1010, servers 1020, and/or other components, devices, and/or systems.

User device 1010 may be an electronic device such as a smartphone, personal computer, tablet, wearable device, etc. In some embodiments, user device 1010 may provide various GUI elements associated with fluid model 100. For example, a touchscreen of user device 1010 may display a GUI associated with a fluid model and receive user inputs via the GUI.

Server 1020 may be an electronic device able to communicate across networks 1030 and execute instructions and/or otherwise process data.

Network(s) 1030 may include various networks and/or communication channels, such as ethernet, Wi-Fi, radio frequency, cellular, distributed, the Internet, etc.

Figure 11:
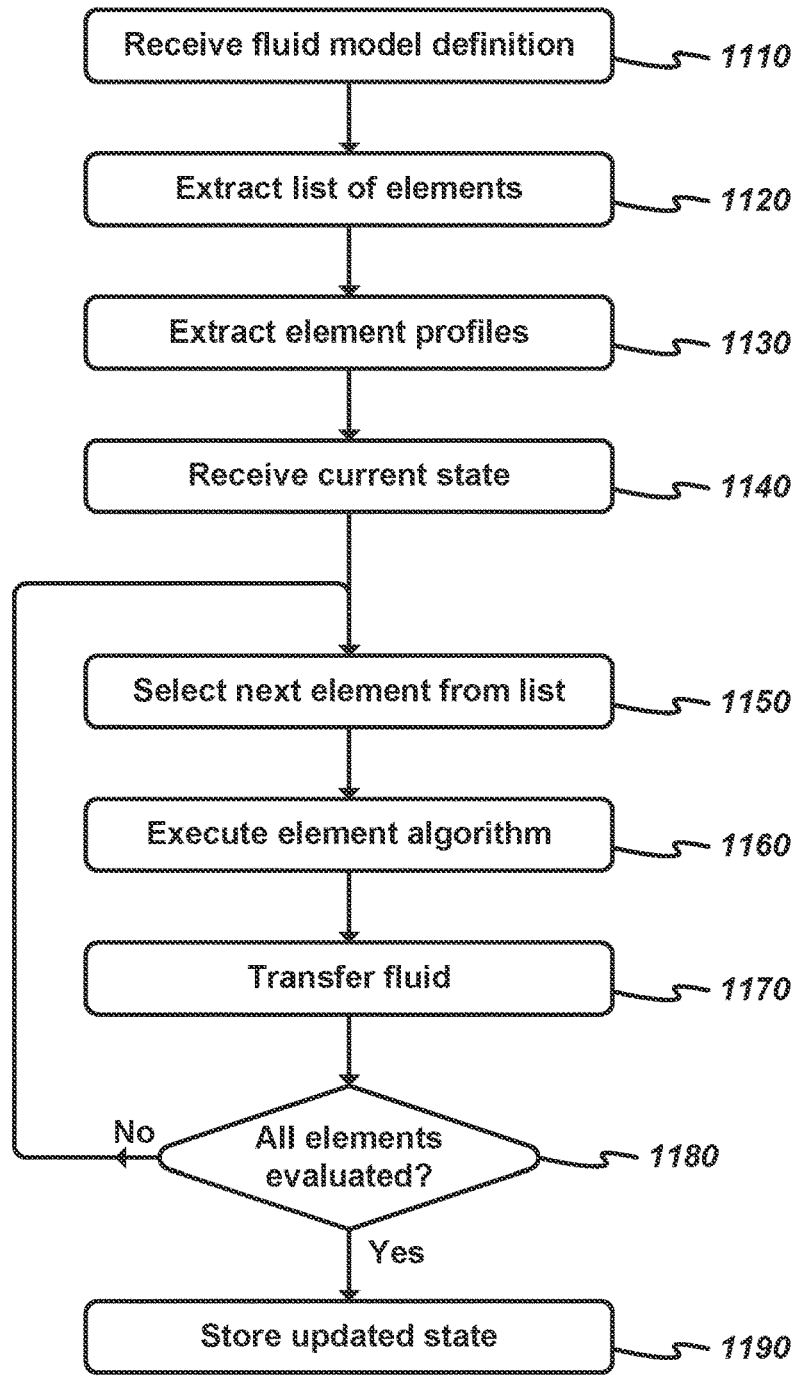
FIG. 11 illustrates a flow chart of an exemplary process that implements a fluid model.

FIG. 11 illustrates an example process 1100 for implementing or operating a physical or virtual fluid model, such as fluid model 100. Such a process may be used to evaluate a current status of the fluid model 100 and apply updates based on various algorithms or equations. The process 1100 may be performed whenever a fluid model 100 is constructed and/or operated. In some embodiments, process 1100 may be performed by fluid model 100.

As shown, process 1100 may include receiving (at 1110) a fluid model definition. A fluid model definition may be received from a resource such as a local storage or memory of the fluid model 100, server 1020, user device 1010, and/or other appropriate resource.

Process 1100 may include extracting (at 1120) a list of elements from the fluid model definition. The list of elements may include a listing of vessels 110, pumps 120, sections of conduit 130, supply connections 140, labels 150, volume indicators 170, and/or other appropriate elements. The elements may be represented by structures such as those shown in data structure diagram 900.

The process 1100 may include extracting (at 1130) element profiles from the fluid model definition. Based on the unique identifier of each element, an element profile 850 may be received. If no specific profile is available, a default profile may be used.

As shown, process 1100 may include receiving (at 1140) the current state of the fluid model. The current state may include, for instance, volume of fluid in each vessel 110, algorithms or parameters used by each pump 120, total supply and/or waste, and/or other appropriate information related to the fluid model 100.

Process 1100 may include selecting (at 1150) the next element from the list of elements, where the next selected element may become the "current" element under evaluation. As described above, each element may be associated with a rank or priority. In some embodiments, each pump 120 may be evaluated serially, based on the rank or priority. In this way, the various elements may be resolved using a step-by-step process.

The process 1100 may include executing (at 1160) an element algorithm associated with the current element from the list of elements. For example, an algorithm or equation associated with a pump 120 may be executed. Following the deer example, a number of deer lost to disease may be calculated based on a percentage of the deer population (e.g., based on the volume of fluid in the deer vessel 110).

As shown, process 1100 may include transferring (at 1170) fluid to, from, and/or via the current element. Continuing the deer example, the calculated volume of fluid associated with deer lost to disease may be moved from the "deer" vessel 110 to the "disease" vessel 110 via the current pump 120. The pump 120 may automatically perform the calculation and transfer and/or an element such as controller 810 may perform the calculation and/or at least partially direct the operations of the pump 120. Process 1100 may update a flag or other reference associated with the current element to indicate the current element has been evaluated (and operated if needed).

Process 1100 may include determining (at 1180) whether all elements have been evaluated. The process 1100 may make such a determination in various appropriate ways, such as determining whether additional elements from the list of elements have not been evaluated (e.g., based on a flag or other reference associated with each element in the list of elements). If the process 1100 determines (at 1180) that all elements have not been evaluated, the process may repeat operations 1150-1180 until the process determines (at 1180) that all elements have been evaluated.

If the process 1100 determines (at 1180) that all elements have been evaluated, the process 1100 may include storing (at 1190) an updated state of the fluid model. The updated state may include, for example, a listing of elements, volume of each vessel 110 in the listing, algorithms or parameters used by each pump 120, total supply and/or waste, and/or other appropriate information related to the fluid model 100.

Figure 12:
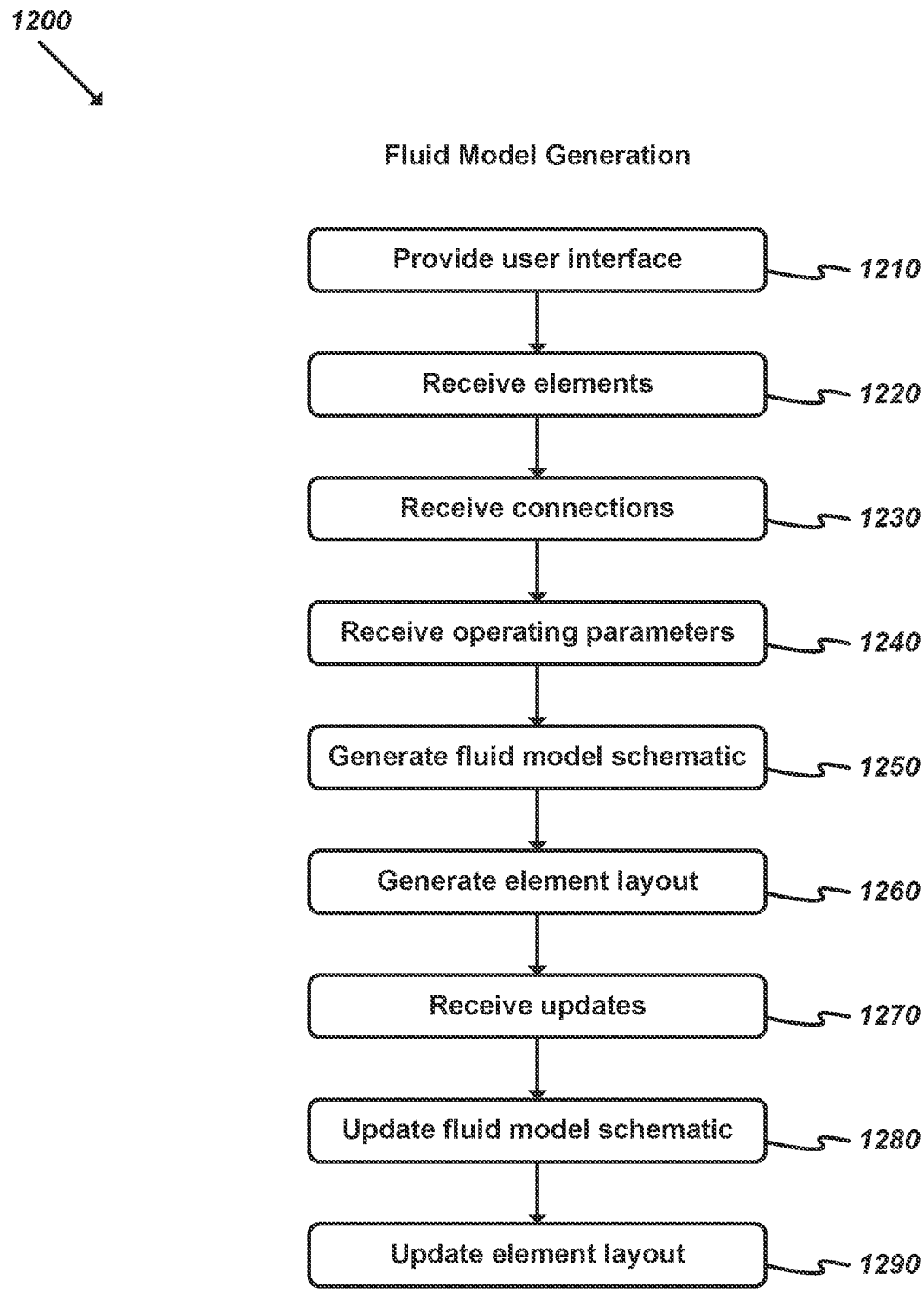
FIG. 12 illustrates a flow chart of an exemplary process that generates a fluid model.

FIG. 12 illustrates an example process 1200 for generating a fluid model, such as fluid model 100. Such a process may be used to generate a fluid model definition including a set of elements, connections between elements, evaluation algorithms, and/or other information associated with a fluid model definition. The process 1200 may be performed when a fluid model is created and/or updated. In some embodiments, process 1200 may be performed by fluid model 100, user device 1010, and/or server 1020.

As shown, process 1200 may include providing (at 1210) a user interface, such as a GUI. The user interface may be provided via a display or similar component of the fluid model 100 or user device 1010. In some cases, the user interface may include a physical interface such as mounting board 710.

Process 1200 may include receiving (at 1220) one or more elements to utilize with the fluid model. Elements may be selected from available physical elements, or listings of available elements from a resource such as a GUI. For example, a user may be able to select a vessel icon via a GUI of some embodiments in order to instantiate a vessel 110.

The process 1200 may include receiving (at 1230) one or more connections associated with each element of the fluid model. The selected elements may be connected in various appropriate ways. For instance, the elements may be connected via conduit 130. As another example, sub-elements, such as inputs and outputs of elements may be connected via a GUI (e.g., by dragging and dropping one connection element to another connection element). Connection elements may include, for example, vessel inputs 420 and outputs 430, pump inlets 620 and outlets 630, inlets and outlets of conduit 130, supplies 140, waste 180, etc.

As shown, process 1200 may include receiving (at 1240) operating parameters for each element utilized with the fluid model. As described above, each pump 120, for example, may be associated with an equation or algorithm that may define aspects of the operation of the pump 120. Such operating parameters may be received via controls of the pump 120, a GUI, and/or other appropriate resources.

Process 1200 may include generating (at 1250) a fluid model schematic. Such a schematic may include a listing of elements, connections, etc.

The process 1200 may include generating (at 1260) an element layout. The element layout may include, for example, x-y coordinates along a resource such as mounting board 710 and/or x-y coordinates associated with a display screen that may provide a virtual fluid model 100. The element layout may be optimized or configured in various appropriate ways. For instance, a vessel 110 associated with a supply 140 may be located at a top left portion of the element layout and each connected element may be placed based on the location of the vessel 110. Each connected element may be placed, proceeding from left to right and top to bottom. As another example, pumps 120 may be located near vessels 110 to which the pumps 120 are coupled.

As shown, process 1200 may include receiving (at 1270) updates to the fluid model. Such updated may include, for instance, addition or removal of elements, updates to connections between elements, updated to operating algorithms (e.g., equations or evaluation algorithms) and/or operating parameters (e.g., thresholds, ratios, percentages, etc.).

Process 1200 may include updating (at 1280) the fluid model schematic. Any element and/or connection updates may be reflected in the updated fluid model schematic.

The process 1200 may include updating (at 1290) the element layout. The element layout may be updated based on inputs received from the user (e.g., the GUI of some embodiments may allow objects such as vessels 110 to be placed as desired within a layout, where other objects may be automatically adjusted to match the updated placement), the updated schematic, and/or other relevant information.

Operations 1270-1290 may be performed iteratively, and/or as a separate process, to allow for various updates to an existing fluid model. A fluid model definition may be generated in some embodiments. The fluid model definition may include, for instance, a listing of elements, a set of connections for each element in the listing, operating parameters for one or more elements in the listing, element attributes (e.g., type, size, etc.), and/or other relevant information (e.g., an initial state or set of operating conditions).

One of ordinary skill in the art will recognize that processes 1100 and 1200 may be implemented in various different ways without departing from the scope of the disclosure. For instance, the elements may be implemented in a different order than shown. As another example, some embodiments may include additional elements or omit various listed elements. Elements or sets of elements may be performed iteratively and/or based on satisfaction of some performance criteria. Non-dependent elements may be performed in parallel. Elements or sets of elements may be performed continuously and/or at regular intervals.

The processes and modules described above may be at least partially implemented as software processes that may be specified as one or more sets of instructions recorded on a non-transitory storage medium. These instructions may be executed by one or more computational element(s) (e.g., microprocessors, microcontrollers, digital signal processors (DSPs), application-specific integrated circuits (ASICs), field programmable gate arrays (FPGAs), other processors, etc.) that may be included in various appropriate devices in order to perform actions specified by the instructions.

As used herein, the terms "computer-readable medium" and "non-transitory storage medium" are entirely restricted to tangible, physical objects that store information in a form that is readable by electronic devices.

Figure 13:
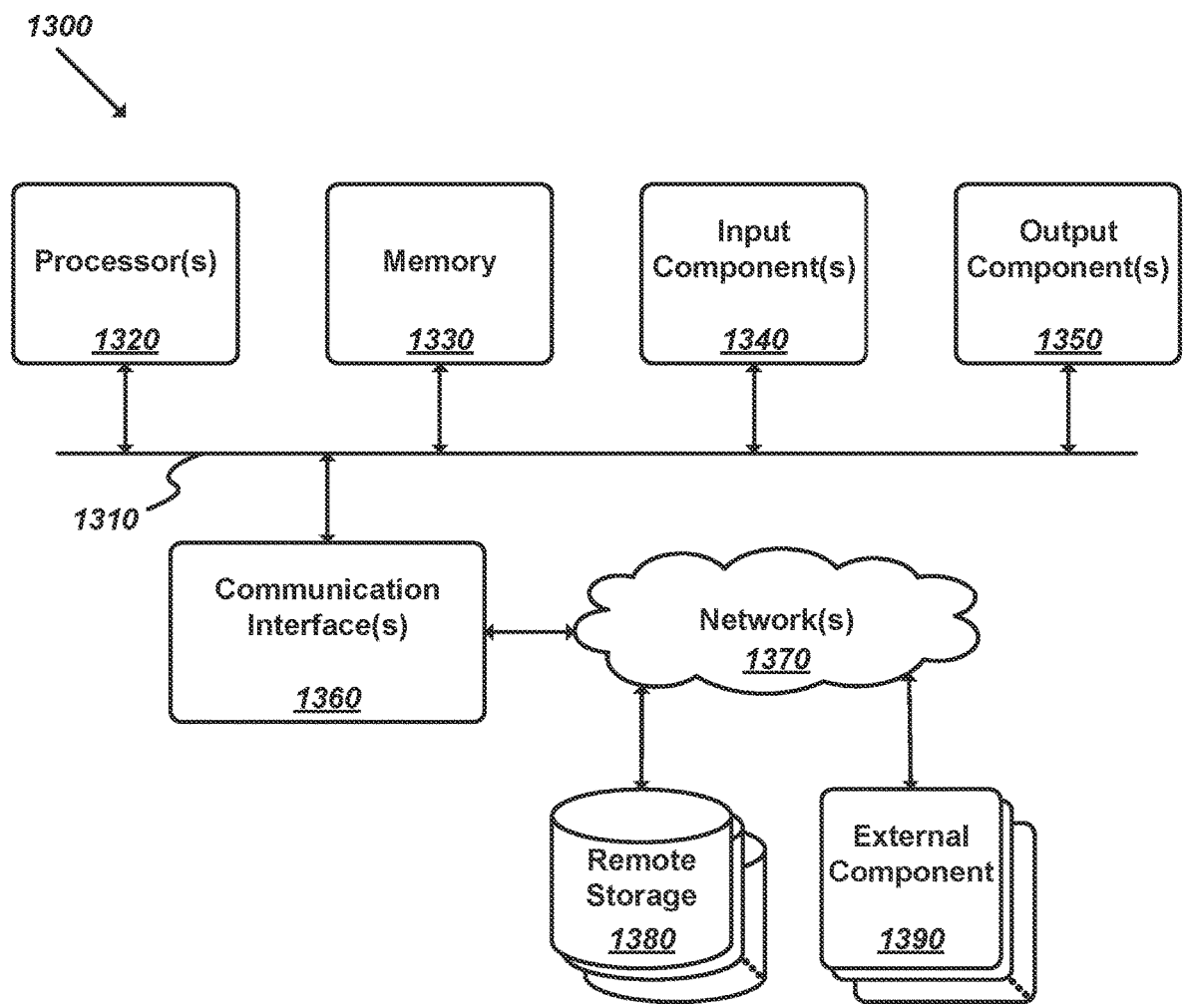
FIG. 13 illustrates a schematic block diagram of one or more exemplary devices used to implement various embodiments.

FIG. 13 illustrates a schematic block diagram of an exemplary device (or system or devices) 1300 used to implement some embodiments. For example, the systems, devices, components, and/or operations described above in reference to FIG. 1, FIG. 2, FIG. 3, FIG. 4, FIG. 5, FIG. 6, FIG. 7, FIG. 8, FIG. 9, and FIG. 10 may be at least partially implemented using device 1300. As another example, the processes described in reference to FIG. 11 and FIG. 12 may be at least partially implemented using device 1300.

Device 1300 may be implemented using various appropriate elements and/or sub-devices. For instance, device 1300 may be implemented using one or more personal computers (PCs), servers, mobile devices (e.g., smartphones), tablet devices, wearable devices, and/or any other appropriate devices. The various devices may work alone (e.g., device 1300 may be implemented as a single smartphone) or in conjunction (e.g., some components of the device 1300 may be provided by a mobile device while other components are provided by a server).

As shown, device 1300 may include at least one communication bus 1310, one or more processors 1320, memory 1330, input components 1340, output components 1350, and one or more communication interfaces 1360.

Bus 1310 may include various communication pathways that allow communication among the components of device 1300. Processor 1320 may include a processor, microprocessor, microcontroller, DSP, logic circuitry, and/or other appropriate processing components that may be able to interpret and execute instructions and/or otherwise manipulate data. Memory 1330 may include dynamic and/or non-volatile memory structures and/or devices that may store data and/or instructions for use by other components of device 1300. Such a memory device 1330 may include space within a single physical memory device or spread across multiple physical memory devices.

Input components 1340 may include elements that allow a user to communicate information to the computer system and/or manipulate various operations of the system. The input components may include keyboards, cursor control devices, audio input devices and/or video input devices, touchscreens, motion sensors, etc. Output components 1350 may include displays, touchscreens, audio elements such as speakers, indicators such as light-emitting diodes (LEDs), printers, haptic or other sensory elements, etc. Some or all of the input and/or output components may be wirelessly or optically connected to the device 1300.

Device 1300 may include one or more communication interfaces 1360 that are able to connect to one or more networks 1370 or other communication pathways. For example, device 1300 may be coupled to a web server on the Internet such that a web browser executing on device 1300 may interact with the web server as a user interacts with an interface that operates in the web browser. Device 1300 may be able to access one or more remote storages 1380 and one or more external components 1390 through the communication interface 1360 and network 1370. The communication interface(s) 1360 may include one or more application programming interfaces (APIs) that may allow the device 1300 to access remote systems and/or storages and also may allow remote systems and/or storages to access device 1300 (or elements thereof).

It should be recognized by one of ordinary skill in the art that any or all of the components of computer system 1300 may be used in conjunction with some embodiments. Moreover, one of ordinary skill in the art will appreciate that many other system configurations may also be used in conjunction with some embodiments or components of some embodiments.

In addition, while the examples shown may illustrate many individual modules as separate elements, one of ordinary skill in the art would recognize that these modules may be combined into a single functional block or element. One of ordinary skill in the art would also recognize that a single module may be divided into multiple modules.

Device 1300 may perform various operations in response to processor 1320 executing software instructions stored in a computer-readable medium, such as memory 1330. Such operations may include manipulations of the output components 1350 (e.g., display of information, haptic feedback, audio outputs, etc.), communication interface 1360 (e.g., establishing a communication channel with another device or component, sending and/or receiving sets of messages, etc.), and/or other components of device 1300.

The software instructions may be read into memory 1330 from another computer-readable medium or from another device. The software instructions stored in memory 1330 may cause processor 1320 to perform processes described herein. Alternatively, hardwired circuitry and/or dedicated components (e.g., logic circuitry, ASICs, FPGAs, etc.) may be used in place of or in combination with software instructions to implement processes described herein. Thus, implementations described herein are not limited to any specific combination of hardware circuitry and software.

The actual software code or specialized control hardware used to implement an embodiment is not limiting of the embodiment. Thus, the operation and behavior of the embodiment has been described without reference to the specific software code, it being understood that software and control hardware may be implemented based on the description herein.

While certain connections or devices are shown, in practice additional, fewer, or different connections or devices may be used. Furthermore, while various devices and networks are shown separately, in practice the functionality of multiple devices may be provided by a single device or the functionality of one device may be provided by multiple devices. In addition, multiple instantiations of the illustrated networks may be included in a single network, or a particular network may include multiple networks. While some devices are shown as communicating with a network, some such devices may be incorporated, in whole or in part, as a part of the network.

Some implementations are described herein in conjunction with thresholds. To the extent that the term "greater than" (or similar terms) is used herein to describe a relationship of a value to a threshold, it is to be understood that the term "greater than or equal to" (or similar terms) could be similarly contemplated, even if not explicitly stated. Similarly, to the extent that the term "less than" (or similar terms) is used herein to describe a relationship of a value to a threshold, it is to be understood that the term "less than or equal to" (or similar terms) could be similarly contemplated, even if not explicitly stated. Further, the term "satisfying," when used in relation to a threshold, may refer to "being greater than a threshold," "being greater than or equal to a threshold," "being less than a threshold," "being less than or equal to a threshold," or other similar terms, depending on the appropriate context.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items and may be used interchangeably with the phrase "one or more." Where only one item is intended, the terms "one," "single," "only," or similar language is used. Further, the phrase "based on" is intended to mean "based, at least in part, on" unless explicitly stated otherwise.

The foregoing relates to illustrative details of exemplary embodiments and modifications may be made without departing from the scope of the disclosure. Even though particular combinations of features are recited in the claims and/or disclosed in the specification, these combinations are not intended to limit the possible implementations of the disclosure. In fact, many of these features may be combined in ways not specifically recited in the claims and/or disclosed in the specification. For instance, although each dependent claim listed below may directly depend on only one other claim, the disclosure of the possible implementations includes each dependent claim in combination with every other claim in the claim set.

I claim:

1. A device comprising:
one or more processors configured to:
receive a fluid model definition associated with a fluid-based system model that is associated with a set of modeled attributes;
extract a list of elements from the fluid model definition, the list of elements indicating a set of vessels and a set of pumps, wherein each modeled attribute from the set of modeled attributes is indicated via an associated vessel from the set of vessels and a quantity of each modeled attribute from the set of modeled attributes is represented by a volume of fluid retained by the associated vessel, wherein each vessel in the set of vessels comprises a set of vessel markings that provide a visual reference of the volume of fluid retained by the associated vessel;
receive a current state of the fluid-based system model;
move fluid between the vessels in the set of vessels, by, iteratively:
selecting a pump from the set of pumps;
evaluating a set of operating conditions associated with the pump;
transferring, via the pump, a volume of fluid that is calculated based on the evaluation of the set of operating conditions, a configurable transfer equation associated with the pump, and the quantity of at least one modeled attribute from the set of modeled attributes;
updating a flag associated with the pump to indicate that the set of operating conditions has been evaluated and the volume of fluid has been transferred; and
determining that all pumps from the set of pumps have been selected, based on the flags associated with the pumps; and
update at least one configurable transfer equation based on user feedback in order to facilitate evaluation of an alternative fluid model definition comprising the updated at least one configurable transfer equation.

2. The device of claim 1, wherein the quantity of at least one modeled attribute is indicated by a first volume of fluid associated with a first vessel from the set of vessels, wherein the first vessel from the set of vessels is coupled to an inlet of the pump.

3. The device of claim 2, wherein the set of operating conditions comprises a second volume of fluid associated with a second vessel from the set of vessels, wherein the second vessel from the set of vessels is coupled to an outlet of the pump.

4. The device of claim 1, wherein the one or more processors are further configured to:
measure a volume of fluid retained by at least one vessel from the set of vessels; and
display the volume of fluid retained by the at least one vessel from the set of vessels.

5. The device of claim 1, wherein the one or more processors are further configured to:
measure a volume of fluid retained by each vessel from the set of vessels;
compare the volume of fluid retained by each vessel from the set of vessels to a minimum threshold; and
receive, at each vessel from the set of vessels, fluid from a supply if the volume of fluid retained by each vessel from the set of vessels is below the minimum threshold.

6. The device of claim 5, wherein the one or more processors are further configured to:
compare the volume of fluid retained by each vessel from the set of vessels to a maximum threshold; and
remove, from each vessel from the set of vessels, fluid to a waste connection if the volume of fluid retained by each vessel from the set of vessels is above the maximum threshold.

7. A non-transitory computer-readable medium, storing a plurality of processor-executable instructions to:
receive a fluid model definition associated with a fluid-based system model that is associated with a set of modeled attributes;
extract a list of elements from the fluid model definition, the list of elements indicating a set of vessels and a set of pumps, wherein each modeled attribute from the set of modeled attributes is indicated via an associated vessel from the set of vessels and a quantity of each modeled attribute from the set of modeled attributes is represented by a volume of fluid retained by the associated vessel, wherein each vessel in the set of vessels comprises a set of vessel markings that provide a visual reference of the volume of fluid retained by the associated vessel;
receive a current state of the fluid-based system model;
move fluid between the vessels in the set of vessels, by, iteratively:
selecting a pump from the set of pumps;
evaluating a set of operating conditions associated with the pump; and
transferring, via the pump, a volume of fluid that is calculated based on the evaluation of the set of operating conditions, a configurable transfer equation associated with the pump, and the quantity of at least one modeled attribute from the set of modeled attributes;
updating a flag associated with the pump to indicate that the set of operating conditions has been evaluated and the volume of fluid has been transferred; and
determining that all pumps from the set of pumps have been selected, based on the flags associated with the pumps; and
update at least one configurable transfer equation based on user feedback in order to facilitate evaluation of an alternative fluid model definition comprising the updated at least one configurable transfer equation.

8. The non-transitory computer-readable medium of claim 7, wherein the quantity of at least one modeled attribute is indicated by a first volume of fluid associated with a first vessel from the set of vessels, wherein the first vessel from the set of vessels is coupled to an inlet of the pump.

9. The non-transitory computer-readable medium of claim 8, wherein the set of operating conditions comprises a second volume of fluid associated with a second vessel from the set of vessels, wherein the second vessel from the set of vessels is coupled to an outlet of the pump.

10. The non-transitory computer-readable medium of claim 7, wherein the plurality of processor-executable instructions are further to:

measure a volume of fluid retained by at least one vessel from the set of vessels; and display the volume of fluid retained by at least one vessel from the set of vessels.

11. The non-transitory computer-readable medium of claim 7, wherein the plurality of processor-executable instructions are further to:

measure a volume of fluid retained by each vessel from the set of vessels;

compare the volume of fluid retained by each vessel from the set of vessels to a minimum threshold; and receive, at each vessel from the set of vessels, fluid from a supply if the volume of fluid retained by each vessel from the set of vessels is below the minimum threshold.

12. The non-transitory computer-readable medium of claim 11, wherein the one or more processors are further configured to:

compare the volume of fluid retained by each vessel from the set of vessels to a maximum threshold; and remove, from each vessel from the set of vessels, fluid to a waste connection if the volume of fluid retained by each vessel from the set of vessels is above the maximum threshold.

13. A method comprising:

receiving a fluid model definition associated with a fluid-based system model that is associated with a set of modeled attributes;

extracting a list of elements from the fluid model definition, the list of elements indicating a set of vessels and a set of pumps, wherein each modeled attribute from the set of modeled attributes is indicated via an associated vessel from the set of vessels and a quantity of each modeled attribute from the set of modeled attributes is represented by a volume of fluid retained by the associated vessel, wherein each vessel in the set of vessels comprises a set of vessel markings that provide a visual reference of the volume of fluid retained by the associated vessel;

receiving a current state of the fluid-based system model;

moving fluid between the vessels in the set of vessels, by, iteratively:

selecting a pump from the set of pumps;

evaluating a set of operating conditions associated with the pump; and transferring, via the pump, a volume of fluid that is calculated based on the evaluation of the set of operating conditions, a configurable transfer equation associated with the pump, and the quantity of at least one modeled attribute from the set of modeled attributes;

updating a flag associated with the pump to indicate that the set of operating conditions has been evaluated and the volume of fluid has been transferred; and determining that all pumps from the set of pumps have been selected, based on the flags associated with the pumps; and updating at least one configurable transfer equation based on user feedback in order to facilitate evaluation of an alternative fluid model definition comprising the updated at least one configurable transfer equation.

14. The method of claim 13, wherein the quantity of at least one modeled attribute is indicated by a first volume of fluid associated with a first vessel from the set of vessels, wherein the first vessel from the set of vessels is coupled to an inlet of the pump.

15. The method of claim 14, wherein the set of operating conditions comprises a second volume of fluid associated with a second vessel from the set of vessels, wherein the second vessel from the set of vessels is coupled to an outlet of the pump.

16. The method of claim 13 further comprising:

measuring a volume of fluid retained by at least one vessel from the set of vessels; and displaying the volume of fluid retained by the at least one vessel from the set of vessels.

17. The method of claim 13 further comprising:

measuring a volume of fluid retained by each vessel from the set of vessels;

comparing the volume of fluid retained by each vessel from the set of vessels to a minimum threshold; and receiving, at each vessel from the set of vessels, fluid from a supply if the volume of fluid retained by each vessel from the set of vessels is below the minimum threshold;

comparing the volume of fluid retained by each vessel from the set of vessels to a maximum threshold; and removing, from each vessel from the set of vessels, fluid to a waste connection if the volume of fluid retained by each vessel from the set of vessels is above the maximum threshold.

* * * * *